(12) United States Patent
Baek

(10) Patent No.: US 6,757,976 B2
(45) Date of Patent: Jul. 6, 2004

(54) METHOD FOR MANUFACTURING ALLOY WHEEL FOR AUTOMOBILE

(75) Inventor: Jeong-Hoon Baek, Seongnam (KR)

(73) Assignee: ASA Co. Ltd., Geumsan-gun (KR)

( * ) Notice: Subject to any disclaimer, the term of this patent is extended or adjusted under 35 U.S.C. 154(b) by 0 days.

(21) Appl. No.: 10/066,912

(22) Filed: Feb. 4, 2002

(65) Prior Publication Data

US 2003/0145466 A1 Aug. 7, 2003

(51) Int. Cl.⁷ .............................................. B23P 15/00
(52) U.S. Cl. ........................... 29/894.322; 29/894.323; 29/894.353; 29/412; 29/417
(58) Field of Search ..................... 29/894.322, 894.323, 29/894.35, 394.351, 894.353, 412, 417

(56) References Cited

U.S. PATENT DOCUMENTS

| | | | | |
|---|---|---|---|---|
| 4,608,848 A | * | 9/1986 | Mele ............................. | 72/184 |
| 5,454,248 A | * | 10/1995 | Inatani .......................... | 72/84 |
| 5,997,102 A | * | 12/1999 | Stanavich ............... | 301/63.103 |
| 6,547,341 B1 | * | 4/2003 | Griffin .................... | 301/63.101 |
| 6,598,296 B2 | * | 7/2003 | Smyth .................... | 29/894.322 |

FOREIGN PATENT DOCUMENTS

| | | |
|---|---|---|
| EP | 0 093 893 A2 | 11/1983 |
| KR | 2001-0066997 | 7/2001 |

\* cited by examiner

*Primary Examiner*—I Cuda Rosenbaum
(74) *Attorney, Agent, or Firm*—Epstein Drangel Bazerman & James, LLP

(57) ABSTRACT

A method for manufacturing an alloy wheel for automobiles, the alloy wheel including a rim part having a portion running in and out from a rim flange to a drop center, and a disc part fitted in the rim part is disclosed. The method comprising forging of an alloy billet to obtain a cup-shaped preform, flowforming of the preform to obtain a seamless tube, cutting of the seamless tube into unit tubes, primary roll forming of the unit tube to obtain a preliminarily shaped unit tube, secondary roll forming of the preliminarily shaped unit to obtain a final shaped rim part, and attaching a disc part to the rim part.

5 Claims, 8 Drawing Sheets

(a)

(b)

(c)  (d)

(e)  (f)

METHOD FOR MANUFACTURING ALLOY WHEEL FOR AUTOMOBILE

BACKGROUND OF THE INVENTION

1. Field of the Invention

The present invention relates to a method for manufacturing an alloy wheel for an automobile, and more particularly to a method for manufacturing an automotive alloy wheel comprising a rim and a disc fitted in the rim.

2. Description of the Prior Art

In general, in manufacturing an alloy wheel for an automobile, it is desired to use aluminum or an aluminum alloy of high strength and light weight to afford a fine structure to the alloy wheel. In light of these objectives, it will be appreciated that a rim (or a drum) is a very important part in manufacturing an alloy wheel for an automobile.

The conventional methods for manufacturing a conventional alloy wheel can be classified into two types. The first being a liquid metal forging method of forging molten metal into a rim and disc complex, and the second being a continuous method of forging a disc type blank. However, the liquid forging method has disadvantages in that the method requires a complex liquid metal forging machine and a complicated process. It is also difficult to create a desired thickness of a rim for achieving an optimal strength and weight reduction. In addition, the continuous forging method has disadvantages in that a procedure for preparing a disc type blank material involves a large loss of raw material and a process for forging the disc type blank into a tube-shaped rim is considerably complicated.

In general, a forward and backward extrusion process is used for production of an alloy wheel rim from an aluminum tube. However, a large-sized pressing machine must be used to produce large tubes having an outer diameter of 400~700 mm and a thickness of 3.5~4.5 mm. Using this method, production costs are increased due to poor yield, thereby deteriorating economic efficiency. There is a process of forming a plate material by a deep drawing process, rather than the forward and backward extrusion process. However, this process is less economical because of the high price of aluminum plates and a large amount of loss when using plates. In addition to the above processes, there is a process of rolling a plate into a cylindrical form and subjecting the cylindrical form to an arc welding process. This process involves problems such as strength reduction of products owing to defects of weld zones, and air leakage from finally produced alloy wheels.

In a process for forming an aluminum tube according to a shape of a rim of an automotive alloy wheel, a spinning technique is predominantly used. The spinning technique is carried out in such a way that an aluminum tube is shaped by being worked with two or more small rollers passing over the tube while being rotated together with a mandrel. Therefore, the productivity rate of wheels depends on forward speed of rollers advancing along a full width of a rim while working the rim. Since the forward speed is determined by the deformation rate of a workpiece, the working speed usually becomes slow. Moreover, since movement of a roller must be controlled in a radial direction and a longitudinal direction of a tube, a control device is required and it is difficult to set the working condition of wheels.

Where a disc part is separately prepared and welded to a rim of an automotive alloy wheel, a TIG welding process or MIG welding process is usually employed for economic efficiency. The welding process involves the changing of dimensions of welded articles and the deterioration of working efficiency due to the high heat generated during the welding process. The welded articles may have defects after the welding process. Consequently, to apply the welding process to the production of an alloy wheel, additional weight is required for safety reasons. In addition, a correcting operation for the deformations of welded articles after a welding process is required. Hence, there is a need to improved the productivity and production cost of the manufacturing of alloy wheels.

SUMMARY OF THE INVENTION

Accordingly, the present invention has been made keeping in mind the above problems occurring in the prior art. An object of the present invention is to provide a method for manufacturing an alloy wheel for automobiles including a rim part having a portion running in and out from a rim flange to a drop center, and a disc part fitted in the rim part.

It is another object of the present invention to provide a method for manufacturing an alloy wheel for automobiles which is intended to remarkably reduce the number of process steps and simplify manufacturing instruments, thereby improving productivity and yield as compared with other methods.

It is still another object of the present invention to provide a method for manufacturing an alloy wheel for automobiles which is intended to produce a seamless tube having an optimal thickness and high strength and quality by a flow-forming process.

It is a further object of the present invention to provide a method for manufacturing an alloy wheel for automobiles which allows a rim part to be subjected to a roll forming process at a high speed by rollers having a narrow range of control.

It is a further object of the present invention to provide a method for manufacturing an alloy wheel for automobiles which is designed to have welded a disc part to the rim part without a distortion of shape and necessity for a correction operation.

In order to accomplish the above object, the present invention provides a method for manufacturing an alloy wheel for automobiles, comprising the following steps: carrying out forging of an alloy billet to obtain a cup-shaped preform; carrying out flowforming of the preform to obtain a seamless tube; cutting the seamless tube into unit tubes; carrying out a primary roll forming of the unit tube to obtain a preliminarily shaped unit tube; carrying out a secondary roll forming of the preliminarily shaped unit tube to obtain a final shaped rim part; and attaching a disc part to the rim part.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
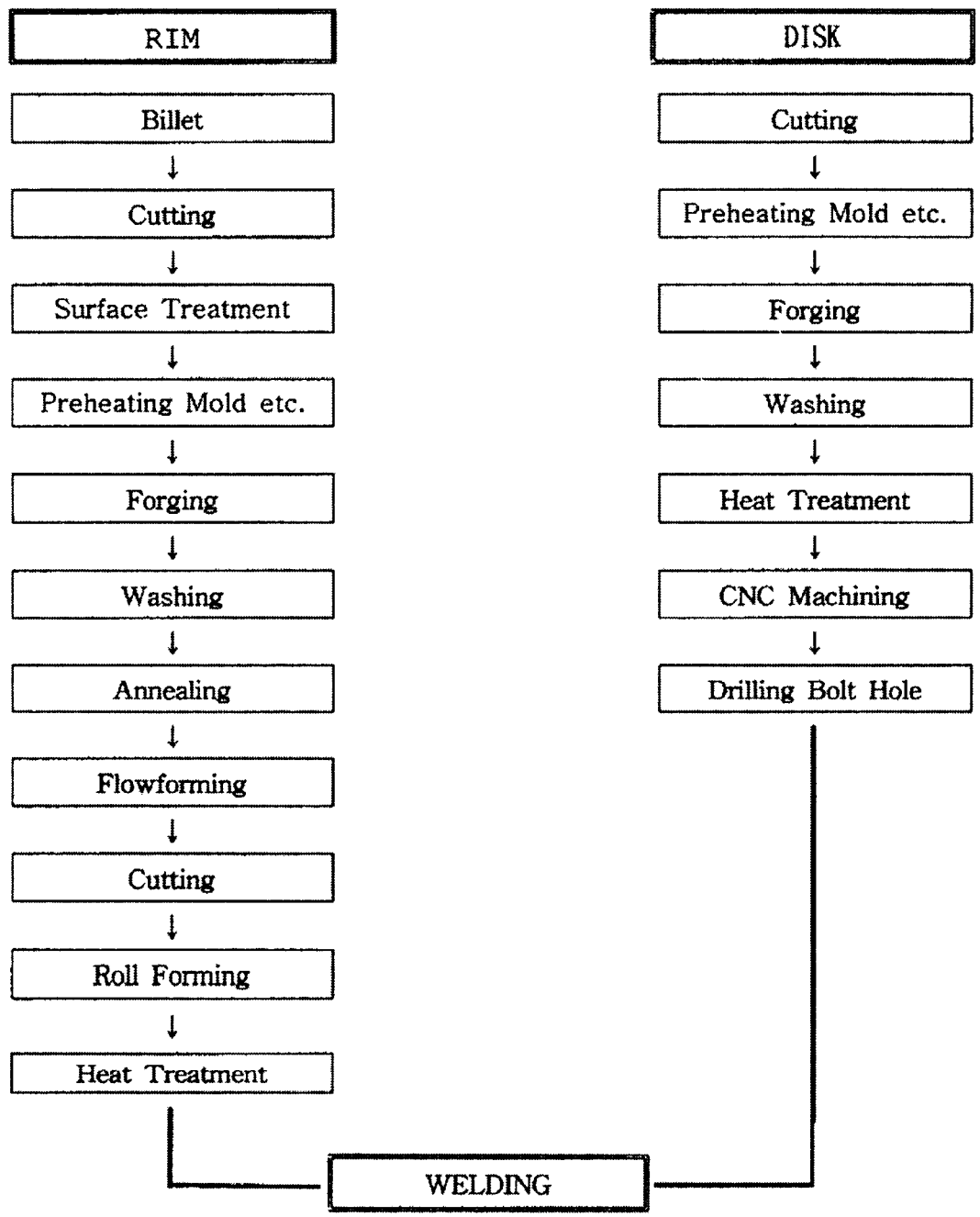
FIG. 1 is a schematic view showing a process for manufacturing an automotive alloy wheel according to the present invention.

Reference now should be made to the drawings, in which the same reference numerals are used throughout the different drawings to designate the same or similar components.

Figure 2:
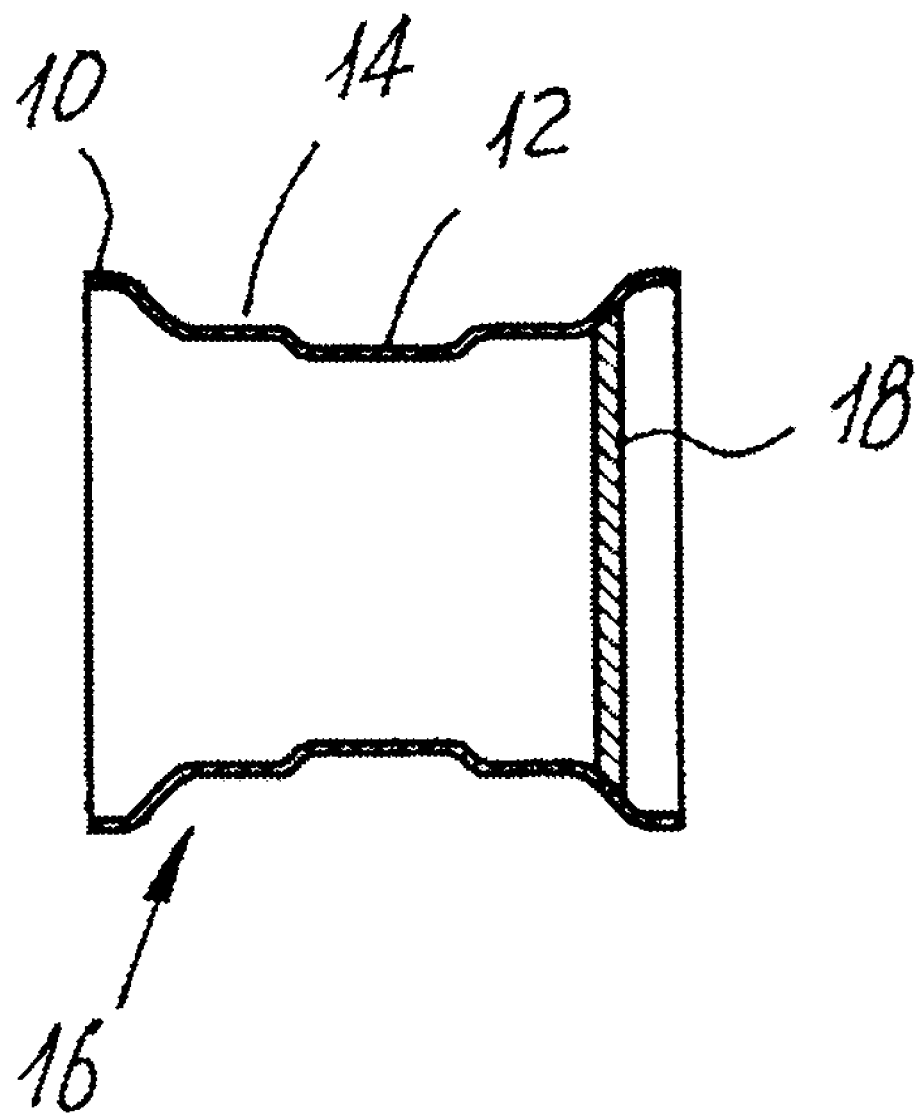
FIG. 2 is a cross-sectional view of an automotive alloy wheel manufactured by a method according to the present invention.

Referring to FIG. 2, there is shown an automotive alloy wheel manufactured by a method according to the present invention. As shown in the drawing, the alloy wheel comprises a rim part 16 having a portion running in and out from a rim flange to a drop center, and a disc part 18 fitted in the rim part 16. To produce such an automotive alloy wheel, the rim part 16 is first manufactured, and the disc part 18 is separately welded to the rim part 16. These steps are shown in FIG. 1.

The method for manufacturing the rim part 16 comprises a process for preparing a seamless tube as a preliminary product to be formed into the rim part 16 and a process for forming the seamless tube into the rim part 16 with a desired shape by a rolling working. The method is described below in three parts. (1) A process for preparing a seamless tube; (2) a process of forming the seamless tube into a rim pat 16 with a desired shape; and (3) a process for welding a disc part to the rim part.

The method for manufacturing an automotive alloy wheel according to the present invention begins with the preparation of a tube for a flowforming process. Ultimately, this tube is a seamless tube 20 (see FIG. 3b) which will be worked into a rim part 16.

Figure 3:
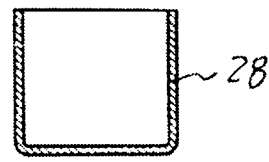
FIG. 3 is a view showing a process for manufacturing an automotive alloy wheel according to the present invention.
Figure 3:
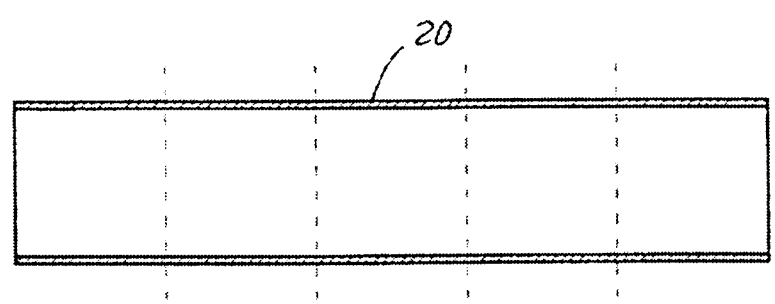
Figure 3:
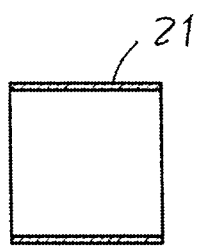
Figure 3:
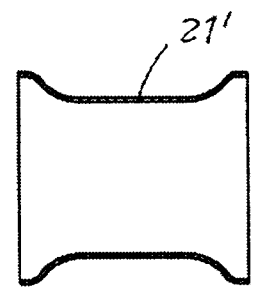
Figure 3:
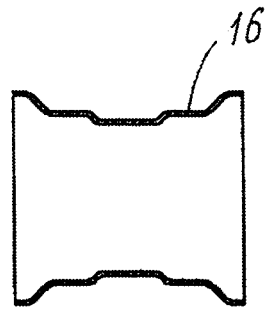
Figure 3:
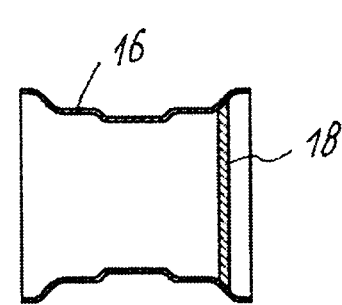
Figure 4:
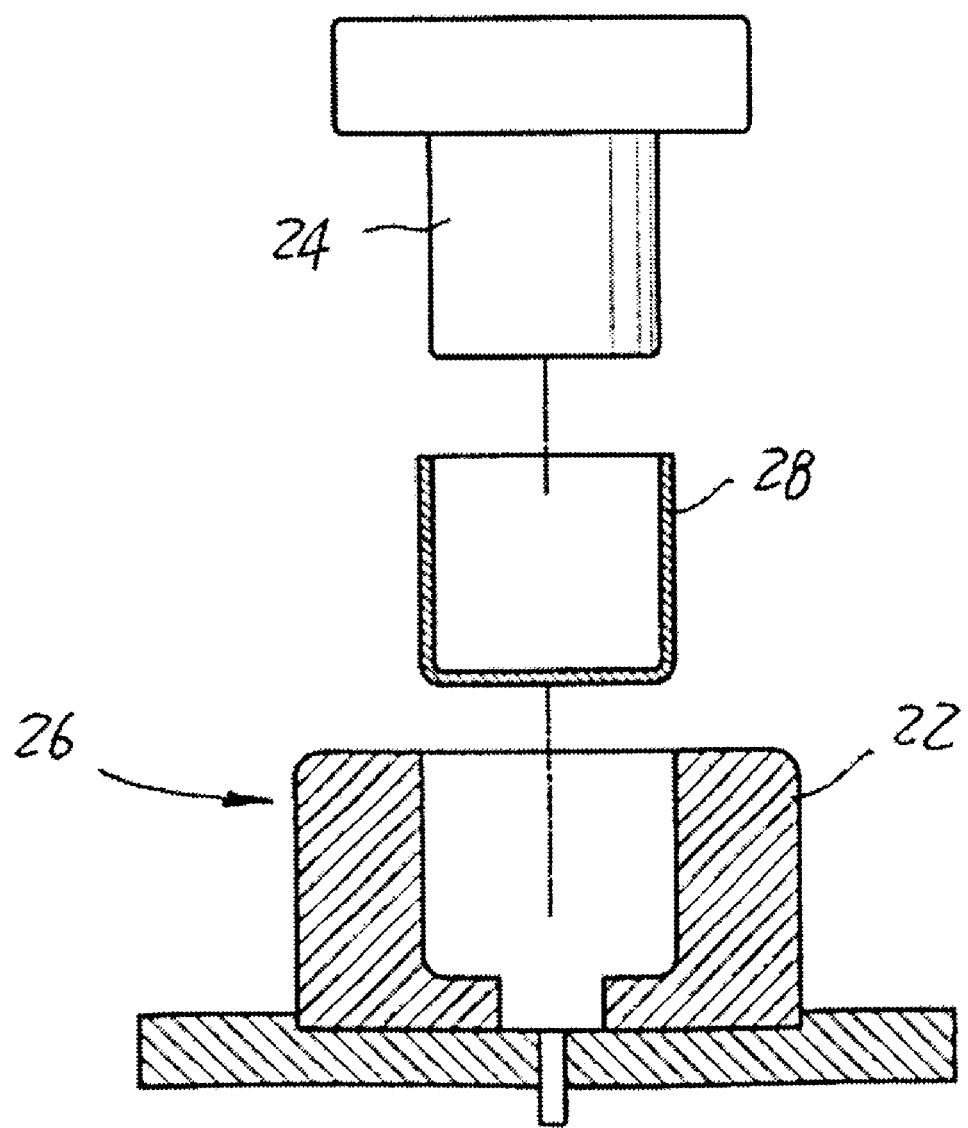
FIG. 4 is a view showing a process for forging a continuous cast billet into a preform.

First, a continuous cast billet is cut by a circular saw machine. The billet is then heated to a forging temperature in a low-frequency induction furnace. Then, the heated metal piece is left in a soaking furnace to achieve a uniform forging temperature. The heated metal piece is subjected to a forging procedure by means of a forging press machine 26 comprising a forging die 22 and a punch 24 (see FIG. 4). More specifically, a lubricant is applied on the forging die 22 and the punch 24, and the heated metal piece is loaded in the forging die 22. Subsequently, the hydraulic pressure of the forging press machine is adjusted to an appropriate pressure, and the metal piece is subjected to a first offset forging and a second finishing forging, thereby obtaining a cup-shaped preform 28, as shown in FIG. 3a.

Figure 5:
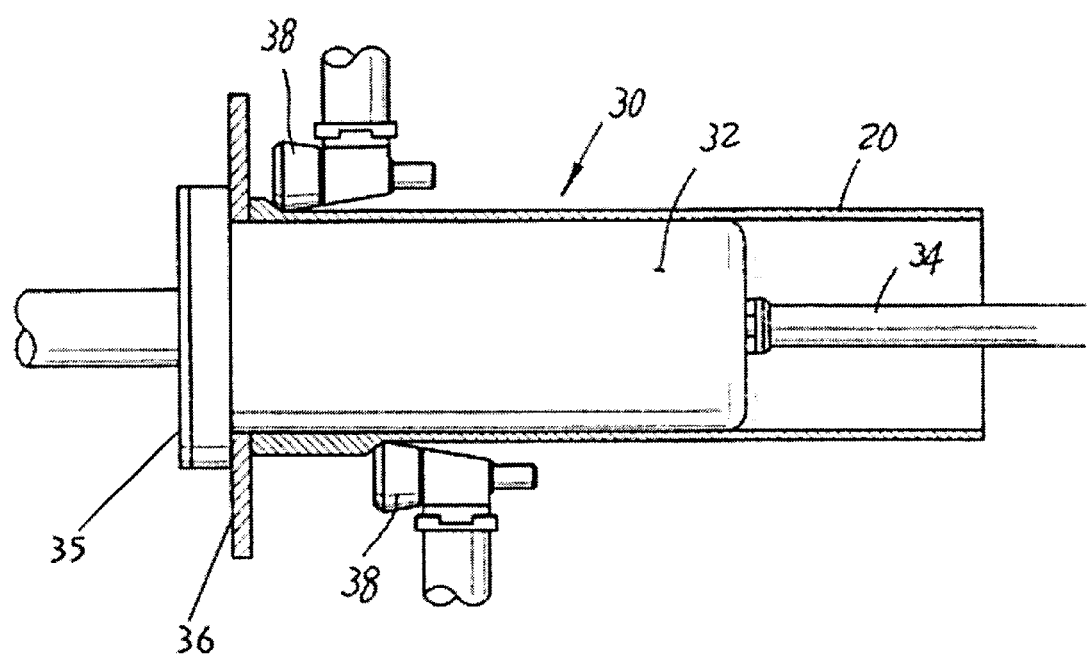
FIG. 5 is a view showing a flowforming process for forming the preform into a seamless tube.

By the above forging processes, the preform 28 has a diameter most suitable to be shaped into a rim part 16 and a dimension suitable to be formed into a seamless tube 20 having a thickness of 3.5~4.5 mm. The preform 28 is precisely formed into a seamless tube 20 by a flowforming machine. The flowforming machine used in this step is shown in FIG. 5.

The flowforming machine for forming the seamless tube 20 uses a mandrel 32 around which the preform 28 is fitted. It contains a tail stock coupled to an end of the mandrel 32 for centrally maintaining the mandrel 32. It has a spindle for turning the mandrel 32 at the other end and an ejector ring for ejecting a forming-finished seamless tube 20 from the mandrel 32. The machine uses three rollers 38 (only two rollers are shown in FIG. 5) situated around the mandrel 32 at an angular interval of 120°, but not disposed on a same circumference. The rollers are intended to roll the preform longitudinally. FIG. 5 shows a seamless tube 20 which is in the process of being formed by the flowforming machine.

Prior to being rolled on the flowforming machine, lubricant is applied to the preform 28 and the perform 28 is fitted around the mandrel 32. The preform 28 is rolled by the rollers 38 while the mandrel 32 is rotated. During the rolling, the rollers 38 are forwardly moved along the mandrel 32 at an appropriate speed, thereby allowing the thickness of the preform 28 to be reduced by different decrements at several circumferential locations throughout its length. Since the flowforming process is adapted to reduce thickness of the preform 28 by three rollers disposed at different locations, the process is more economical when compared with a conventional process which uses one roller.

By applying the flowforming process described above to a production of a two-piece type rim which is a model for lightening an automotive alloy wheel, the production cost of an alloy wheel can be remarkably reduced. In addition, a seamless tube of higher strength and quality, as compared to a conventional forged alloy wheel, can be produced.

Since the internal diameter of a seamless tube 20 is determined by the external diameter of the mandrel 32 of a flowforming machine 30, the thickness of the seamless tube can only be changed by the positioning of the rollers 38 when forming seamless tubes of a uniform internal diameter.

Since a seamless tube manufactured by a flowforming process has fine grains and fine surface roughness, its mechanical properties such as tensile strength and elongation are excellent (AA6061-T6 specimen, tensile strength: 32 kgf/mm2, elongation: 12% or more). A seamless tube 20 manufactured using the techniques of the present invention has a greater dimensional accuracy of its external and internal diameters taking into account equipment and roller tolerances. The seamless tube manufactured using the present invention has superior dimensional accuracy to that of the conventional process for manufacturing large-sized tubes having a diameter of 400~700 mm. It has a dimensional accuracy of 0.05~0.1 mm for the external diameter.

Figure 6:
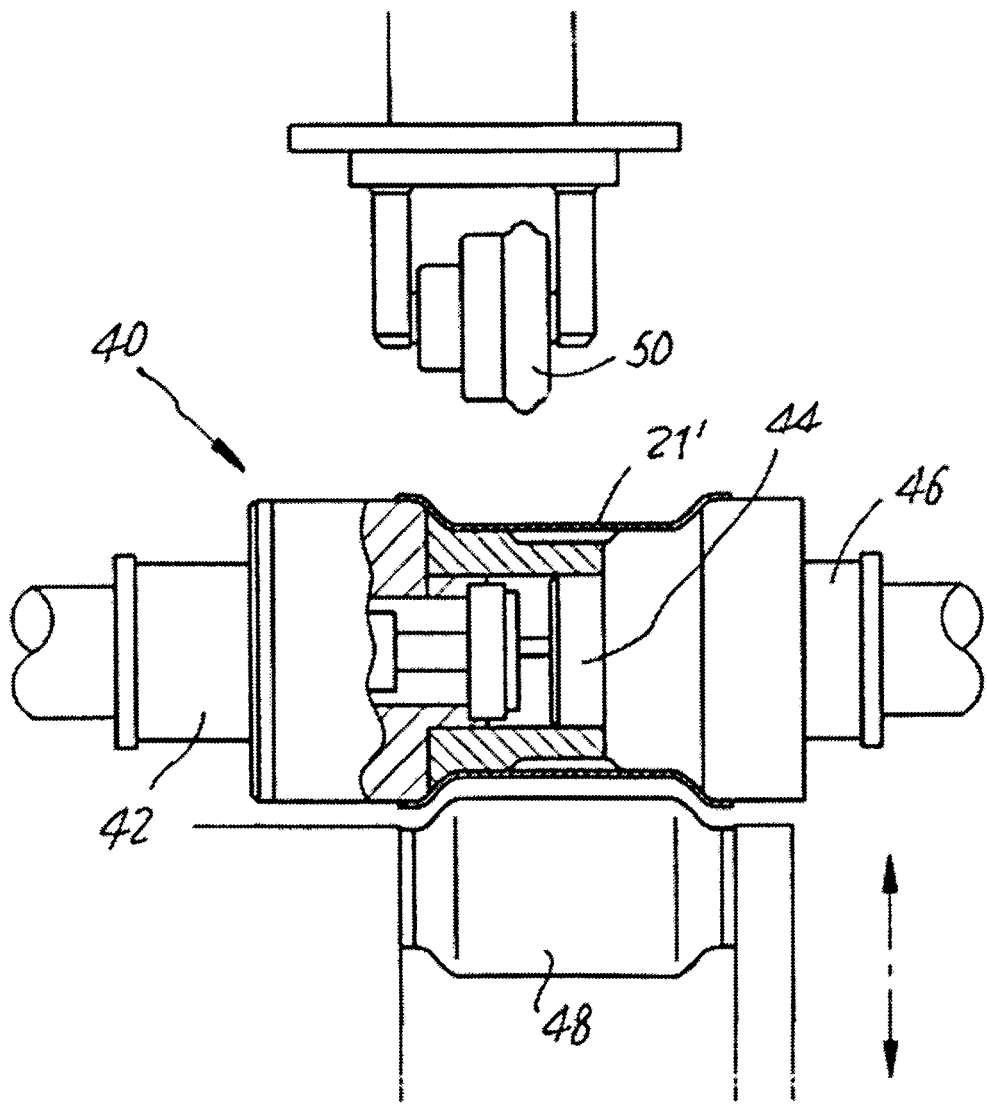
FIGS. 6 and 7 are views showing a roll forming process for forming a rim part.
Figure 7:
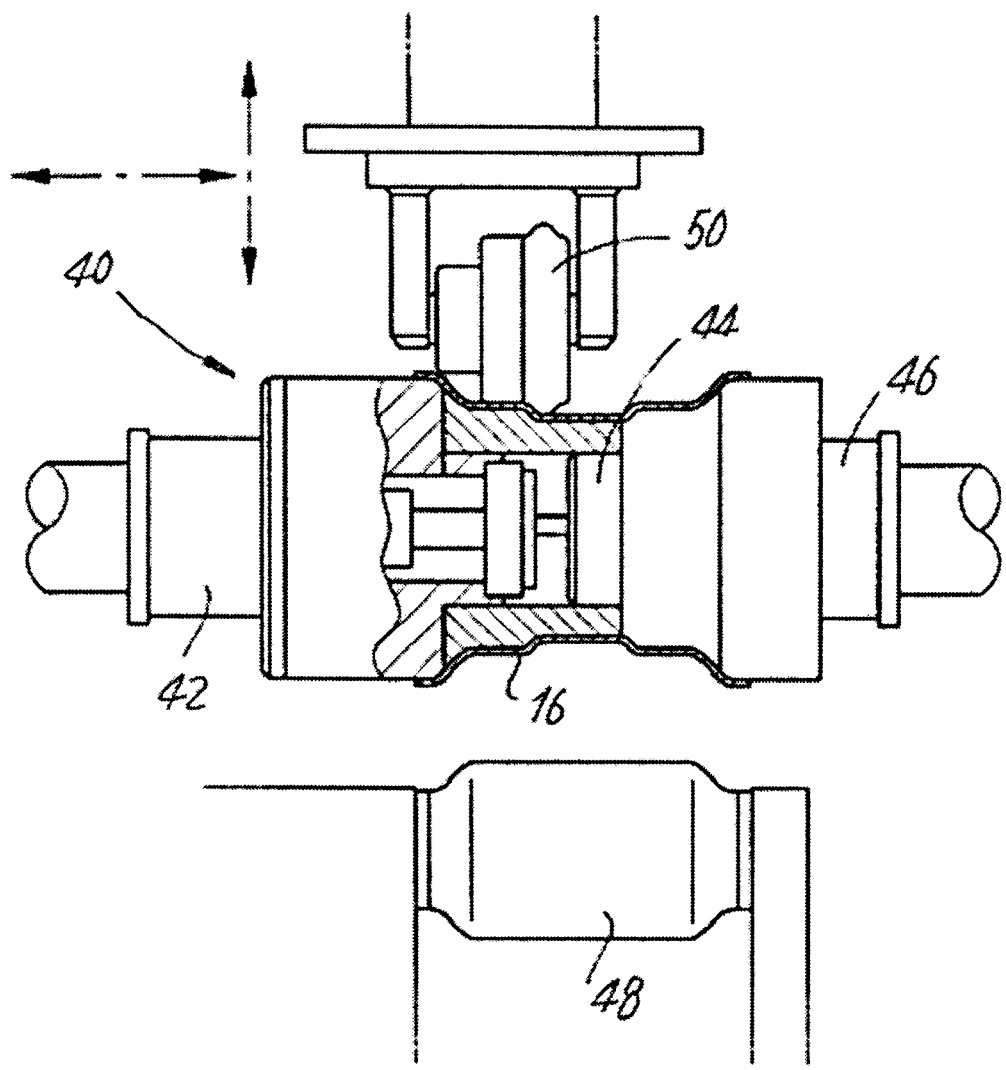
Figure 8:
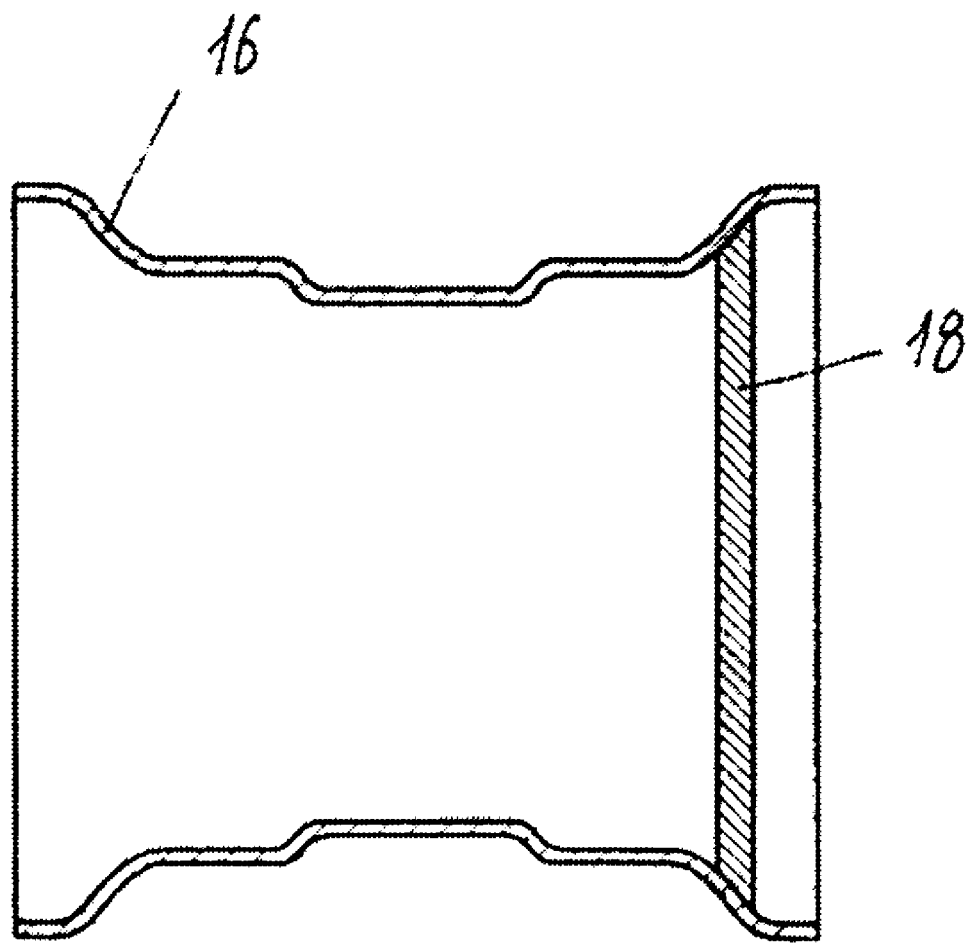
FIG. 8 is a cross-sectional view showing a finished automotive alloy wheel in which a disc part is welded to a rim part.

The seamless tube 20 obtained by the above process is cut into tube pieces of a unit length suitable to be shaped into rim parts 16. The cut tube pieces are formed into rim parts 16 by a roll forming machine. The roll forming machine 40 used in this process is shown in FIGS. 6 and 7.

The roll forming machine 40 comprises a spindle 42, a mandrel 44 fixed to the spindle 42 at its end and having an outer contour corresponding that of a rim part to be formed, a tail stock 46 supporting the other end of the mandrel 44, and first and second rollers 48 and 50 for forming the tube piece into a rim part. The first roller 48 can move only in the radial direction of the work piece while the second roller 50 can move not only in the axial direction of the work piece but also in the radial direction of the work piece.

As mentioned above, the seamless tube 20 is cut into tube pieces of a unit length suitable to be shaped into rim parts 16 (FIG. 3b). The cut tube unit 21 is fitted around the mandrel 44, fixed to the spindle 42 of the roll forming machine 40 and is stably supported by the tail stock 46. Thereafter, the first roller 48 moves toward the tube unit 21 while the spindle 42 is rotated, so that the tube unit 21 is preliminarily formed into a preformed tube unit 21' of approximately the shape of the final rim part 16. The reason why the tube unit 21 is preliminarily formed into the preformed tube unit 21' is that the tube unit 21 may be cracked or may have internal defects due to excessive strain beyond its deformation limit when the tube unit 21 is directly formed into the final shape of the rim part by the first roller 48. As such, the first roller 48 preliminarily moves in the radial direction of the tube unit to form the tube unit into a preformed tube unit 21 having a modest deformation amount, thereby allowing the tube unit to be uniformly worked when being subjected to the final rolling step.

After the unit tube 21 is preliminarily formed into a preformed tube unit 21' by the first roller 48, the first roller 48 is retracted, and at the same time the second roller 50 is moved toward the preformed tube unit 21'. As mentioned above, since the second roller 50 is able to move axially and radially with respect to the preformed tube unit 21', the preformed tube unit 21' can be formed into a rim part 16 having a portion running in and out from a rim flange to a drop center.

A disc part 18, which is separately manufactured by a conventional method, is attached to the final formed rim part 16 by a welding operation. In this embodiment, the disc part 18 is welded to the rim part 16 by a laser welding technique. Such a laser welding technique can be substituted with an existing TIG welding or MIG welding. When carrying out the laser welding process, metal articles to be welded are locally and quickly heated, consequently, the time period required to finish the welding process is reduced. Since a welded area is quickly cooled, there is no distortion after the welding process. In particular, the welding strength of the present invention process is superior to the above-mentioned existing TIG or MIG welding techniques. Since this process allows the welded articles to have fewer defects such as blow holes, the strength of the welded articles is improved.

The disc parts 18 and rim parts 16 are manufactured to a size such that when placed together, form fitted parts 16 and 18. The fitted parts 16 and 18 are transferred to a welding jig where the contact area between the disc part and the rim part is welded by a laser welding machine of 6 kW which moves along the periphery of the disc 18 in a short period of time.

By carrying out the welding process of the rim part 16 and the disc part 18 with a laser, the time required for welding is shortened, there is no distortion of a wheel due to localized heating, and an additional correction operation is no longer required. Moreover, since there are no defects such as blow holes caused by a TIG or MIG welding process, a welded article has excellent strength. In addition, welded articles are reduced in weight. Furthermore, since a peripheral welding area of a disc having a diameter of 450 mm can be welded within 30 seconds, productivity is considerably enhanced.

As described above, the present invention provides a method for manufacturing an automotive alloy wheel which is intended to remarkably reduce the number of steps and simplify the manufacturing instruments used, thereby improving productivity and yield as compared with other methods. In particular, since the method according to the present invention produces a seamless tube by a flowforming process utilizing the flowability of a metal structure of the tube, a diameter and a thickness of a tube can be precisely controlled and a high strength and quality can be achieved. Also, since the rim part is subjected to a roll forming process at a high speed by rollers having a narrow range of control, it is possible to achieve improved productivity and a significant reduction of defects. The present invention has further advantages in that there is no distortion and no necessity for a correction operation, since the disc fitted in a rim is welded by a laser welding process.

In addition to the above advantages, the method for manufacturing an automotive alloy wheel according to the present invention has advantages in that the method according to the present invention uses flowforming cast billet as starting materials, causing the amount of scraps to be significantly reduced, thereby it is considerably advantageous in terms of raw material cost as compared with conventional methods using plate-shaped materials or disc-shaped materials.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for manufacturing an alloy wheel for automobiles including a rim part having a portion running in and out from a rim flange to a drop center, and a disc part fitted in the rim part, comprising the steps of:

carrying out forging of an alloy billet to obtain a cup-shaped preform;

carrying out flowforming of the preform to obtain a seamless tube;

cutting the seamless tube into unit tubes;

carrying out primary roll forming of the unit tube to obtain a preliminarily shaped unit tube;

carrying out secondary roll forming of the preliminarily shaped unit tube to obtain a final shaped rim part; and attaching a disc part to the rim part.

2. The method as set forth in claim 1, in which the step of forging the alloy billet includes the steps of cutting a continuous cast billet, heating the cut billet to a uniform forging temperature, carrying out primary offset forging of the heated billet, and carrying out finishing forging of the billet.

3. The method as set forth in claim 1, in which the flowforming step includes the steps of fitting the preform on a mandrel and rotating the mandrel, and radially and axially moving three rollers disposed around the mandrel at an angular interval of 120, but not disposed at a same circumferential line at a predetermined speed, to roll the preform throughout its length, thereby causing the preform to be continuously reduced in thickness.

4. The method as set forth in claim 1, in which the primary roll forming step includes moving a first roller of a roll forming machine in a radial direction of the unit tube to obtain the preliminarily shaped unit tube and then retract the first roller, and the secondary roll forming step includes moving a second roller of a roll forming machine in radial and axial directions of unit tube to obtain the final shaped rim part.

5. The method as set forth in claim 1, in which the step of attaching the disc part to the rim part includes fitting the disc part into the rim part by shrink fitting and carrying out a laser welding of the disc and rim parts held in a welding jig.

* * * * *